United States Patent Office 2,728,713
Patented Dec. 27, 1955

2,728,713

HIGH ACTIVITY REFORMING CATALYSTS FOR USE IN THE HYDROFORMING OF NAPHTHA

Kenneth K. Kearby, Cranford, Isidor Kirshenbaum, Union, and George R. Gilbert, Elizabeth, N. J., assignors to Esso Research and Engineering Company, a corporation of Delaware No Drawing. Application September 25, 1952, Serial No. 311,542

6 Claims. (Cl. 196—50)

This invention relates to the preparation of catalysts for the treatment and conversion of hydrocarbons. More specifically, it relates to a new and improved method of preparation of a catalyst containing small amounts of a metal catalyst on an alumina-containing catalyst support.

The catalytic metals with which this invention is concerned are the noble metals of group VIII of the periodic system, which are known to be highly active for the hydrogenation and dehydrogenation of hydrocarbons. These catalysts also have a pronounced effect on splitting the carbon-hydrogen and carbon-carbon bonds of hydrocarbon molecules at elevated temperatures. The specific noble metals with which the invention is particularly concerned include platinum, palladium, rhodium, iridium and the like.

It has recently been found that these nobel metal catalysts can be employed to particular advantage on a catalyst support in which alumina is the major constituent, and the catalytic metal is present in very small amounts or even trace amounts. Thus, a variety of catalysts containing fractional percentages of platinum or palladium on an alumina-containing carrier have been found to be applicable to hydrocarbon conversion processes. They may be used to convert naphtha fractions of low motor fuel value to premium quality products having a high aromatic content, and improved volatility. An important advantage of these catalysts is that the particular combination of reactions which they promote with a naphtha feed stock is such that the original low octane quality feed constituents may be almost completely removed by a combination of isomerization, dehydrogenation and cyclization reactions.

These catalysts have been particularly useful in reactions of the general type known as hydroforming. This is an operation carried out in the presence of a solid catalyst and in an atmosphere containing free hydrogen, but without a net consumption of hydrogen. In hydroforming operations, there is ordinarily a net evolution of hydrogen due to the transformation of other hydrocarbons into aromatics. The group of hydrocarbons or aromatic precursors thus transformed includes substantially all of the $C_6$ ring naphthenes, a varying proportion of the $C_5$ ring naphthenes, and a proportion of the original paraffins which varies both with operating conditions and with the content of $C_6+$ hydrocarbon chains in the paraffin molecules present.

The platinum catalysts on an alumina base have been found to suffer from several well-known disadvantages. In the hydroforming of virgin naphtha feed stocks, for example, it is desirable to use these catalysts under relatively severe conditions of the order of 50 to 300 pounds p. s. i. g. since this results in a product of exceptionally high aromatic content and motor fuel quality. Unfortunately, the reactions which take place under these conditions, at relatively low hydrogen partial pressure, also result in the formation of an appreciable carbonaceous deposit which rapidly deactivates the catalyst. For this reason it has been common practice to avoid the use of such low operating pressures in spite of the high product quality which can be obtained by their use.

At higher operating pressures of the order of 500 to 1,000 p. s. i. g., the same catalysts give a non-regenerative process in which the catalyst retains its activity over long periods of time without deactivation. Such operations may result in a fairly complete conversion of the cyclohexanes in the original feed stock to the corresponding aromatics. In addition there is a certain amount of aromatics formed from other types of hydrocarbons. For a given catalyst, however, the use of high hydrogen pressures tends to increase the breakdown of the original molecular structure to lower molecular weight saturated materials by a combination of various cracking, dealkylation, and re-hydrogenation reactions known collectively as hydrocracking. Hydrocracking under these high pressure hydroforming conditions can be minimized, but only to a limited extent, by variations in the composition of the catalyst.

In hydroforming, as in many other hydrocarbon conversion processes, the more severe treating conditions of low pressure and high temperature which give a product of higher octane quality do so only at the expense of a loss in gasoline yield. This loss in yield ordinarily corresponds first to a degradation to light gaseous products. The degradation of feed to coke and to heavy by-products is often an even more serious matter since, in addition to the loss in yield, it may result in a rapid loss in catalyst activity. The development of new catalysts has been particularly important to the extent that it has made possible the preparation of materials of high octane quality and desirable volatility without an increase in the degradation of feed to gas, coke, and heavy liquid by-products. At the same time, it is important to develop catalysts which give the highest quality product. For many uses, such as aviation gasoline, the production of premium quality is an absolute requirement.

Experience has shown that it is not an easy matter to regenerate a coked catalyst of this type without doing permanent harm to the catalyst activity. While no exact explanation of the deactivation process is known, X-ray and other crystallographic studies indicate that, when a coked catalyst is regenerated by air burning, the platinum (originally present in a highly dispersed amorphous form) has a tendency to grow into metallic crystals having a larger size and lower surface area corresponding to a greatly reduced catalytic activity. While various methods have been proposed to minimize this tendency, including changes in the method of platinum impregnation and activation of the platinum-on-alumina catalyst, it is best in any case to operate at minimum carbon production. With the usual platinum-on-alumina base catalysts this places a limit on either the operating severity and product quality or on catalyst life, since operating at a severity sufficient to give high octane quality results in high coke formation and an increased rate of ultimate deactivation.

It is an object of the present invention to prepare a noble metal catalyst which will give premium octane quality with very low carbon production. Another object is to prepare a platinum type catalyst on a modified alumina-containing base which will retain the metal in a highly active condition during prolonged period of use. Still another object is to prepare a platinum-type catalyst on a promoted-alumina base suitable for continuous operation under non-regenerative conditions, with minimum coke production. A more specific object is to prepare a platinum catalyst on a zinc-alumina base which will give a product quality of at least 90 clear Research octane number, or better, with a high yield of aromatics and little or no coke production.

According to the present invention highly active catalysts for the reforming operation are produced by impregnating a $ZnO.Al_2O_3$ base with 0.1 to 5% by weight of platinum or palladium, preferably 0.1 to 2% of colloidal platinum. Catalysts thus prepared are found to be more selective in producing aromatics and a high octane number gasoline than similarly prepared catalysts on alumina bases or on an alumina base promoted with various acidic constituents such as silica, HF or HCl.

The zinc-alumina base for these catalysts will ordinarily be one in which the zinc and alumina are present in about molar proportions. This composition may range, however, from 30 to 50% ZnO, and promising compositions may also be made having a ZnO concentration outside of the preferred range. The method of preparation of the zinc-alumina base can be varied, depending upon the zinc and aluminum compounds most readily available. A variety of methods of preparing a zinc spinel catalyst base having compositions within this preferred range have been described in the literature, including wet mix procedures, co-precipitation, dry-mix techniques and the solution of one component in various soluble compounds of the other. The base may be combined with platinum or a platinum compound before or after precipitation or gelling, or before or after drying or calcining. Various methods of obtaining a fine degree of dispersion of the metallic constituent may be employed.

A typical catalyst preparation according to this invention will now be described, with comparative tests against other standard platinum-on-alumina base catalysts.

EXAMPLE I

Preparation of catalysts (A) 99.6 $ZnO-Al_2O_3$-0.4 Pt: The zinc aluminate base was prepared by reacting a solution of zinc nitrate and aluminum nitrate with aqueous ammonia at a pH of 6.5. After washing and drying at 250° F. the base was ball-milled with a dilute solution of $H_2PtCl_6-6H_2O$. The resultant catalyst was dried at 250° F., calcined for 3 hours at 800° F. and reduced in hydrogen at 950° F.

(B) 99.5 $Al_2O_3$-0.5 Pt: This catalyst was prepared in a similar manner except that a dried granular activated alumina promoted with five weight percent of silica (Alorco grade H-41) was used as the base instead of zinc aluminate.

(C) 99.5 $Al_2O_3$-0.5 Pt: An alumina base was prepared by reacting a solution of aluminum chloride with aqueous ammonia at a pH of 10. After washing and filtering, the catalyst was peptized with glacial acetic acid and HF (2% on the $Al_2O_3$). The alumina was dried at 250° F. and calcined for 3 hours at 750° F. The resultant base was milled with a dilute solution of chloroplatinic acid, dried at 250° F. and calcined at 1200° F.

EXAMPLE II

Comparison of catalysts

[200–430° F. nominal boiling range, heavy virgin naphtha; 6.5–6.6 $H_2$/HC mole ratio.]

| Catalyst | 0.4 Pt.-99.6 ZnO-$Al_2O_3$ | 0.5 Pt.-99.5 H-41 $Al_2O_3$ | 0.5 Pt.-99.5 $Al_2O_3$(HF) |
|---|---|---|---|
| Pressure | 650 | 650 | 650 |
| Temperature, °F | 900 | 900 | 925 |
| Feed Rate, v./v./hr | 1 | 1 | 1 |
| $C_4$+ Gasoline: | | | |
| Res. O. N. (clear) | 95 | 86 | 81 |
| Yield, Vol. Percent on Feed | 74 | 74 | 79 |
| Net yield of Aromatics, vol. percent on feed | 28 | 16 | 13 |

Operation at 650 pounds gauge pressure with each of these catalysts gives a product of improved quality, with substantially no coke degradation on the catalyst. Each of the three catalysts, therefore, gives a process which can be run continuously in non-regenerative operation. The catalyst of the present invention, and catalyst B of Example I above, platinum-on-silica-promoted alumina, give substantially the same $C_4$+ liquid yield. The octane quality produced with the platinum or zinc aluminate is markedly superior, however, and equivalent to that which can be obtained with a platinum-alumina catalyst only under conditions of much higher severity which result in coke formation on the catalyst. The platinum on HF-promoted alumina gives, in this example, a somewhat higher yield at still lower octane number, and the yield octane relationship is essentially the same here as for the platinum on silica-promoted alumina.

Other zinc aluminate platinum catalysts of similar activity may be prepared by various methods, including those given below:

EXAMPLE III

A solution of sodium aluminate and a mixed solution of a platinum salt and a zinc salt are added simultaneously to a stirred vessel to form a mixed precipitate. The salts used may be the chloride, nitrate or sulfate. Alternatively, the mixed salt solution may be added to the sodium aluminate solution. A pH of 7.5 to 8 is established at the end of the reaction, when using aluminate as the source of alumina, and this may be maintained during the precipitation if desired. The precipitate is filtered, washed, dried, pilled and reduced to give the finished catalyst. It is also possible to make a platinum-free support by this method, and then impregnate the calcined support with about 0.5% platinum.

EXAMPLE IV

A soluble alcoholate of aluminum (ethylate, isopropylate, butylate, amylate, etc.) is agitated with a solution of platinum chloride and zinc acetate in water and the water layer separated and dried. Alternatively the platinum chloride may be dissolved in the aluminum alcoholate solution and subsequently hydrolyzed with zinc acetate in solution, preferably using only small amounts of water. Acetic acid may be included either in the water solution or in the alcoholate solution. Also, the zinc aluminate may be made by this method and then be impregnated with a platinum solution.

In general, hydrous oxides, precipitates, or gels of zinc oxide and alumina may be combined by mixing and used as a support for platinum. Increased isomerizing and cracking activity may be imparted to these catalysts by incorporating 1 to 10 percent of silica or 1 to 5 percent of HF or other volatile fluoride.

In further tests at the 200–400 pounds pressure range, the $ZnO.Al_2O_3$ base catalysts give about 1.5 to 3% more gasoline yield than the corresponding acid-promoted alumina base catalyst, at the 90–95 Research O. N. level. This advantage is realized both with naphthenic and paraffinic heavy naphtha cuts. It is particularly important with highly paraffinic naphthas, which may contain less than 20% of naphthenic constituents and are subject to a more serious feed degradation to gas and coke when hydroforming to a high octane level.

The naphtha feed stock to be treated by the reforming process can be derived from a wide variety of sources, including straight run or virgin naphtha and various secondary products derived from petroleum or other hydrocarbon feed stocks. It may be understood to include both light naphthas and heavy naphthas within the boiling range from about 0° to 450° F. Catalysts prepared according to the present invention may be applied to reforming broad fractions within the naphtha boiling range for the preparation of fuels such as gasoline, or to narrow boiling fractions for the preparation of specific compounds such as benzene or toluene.

Catalysts prepared according to the present invention may be made into the form of powder, microspheres, granules, pellets or larger spherical particles depending upon whether the hydrocarbon treatment for which they are to be employed is carried out by the fluid solids technique or by a moving bed or fixed bed process.

While the above description has directed attention primarily towards the use of these catalysts in hydroforming, they may be also employed to advantage in a variety of hydrocarbon conversion processes involving hydrogen transfer or the presence of molecular hydrogen as a reactant or product gas. This includes catalytic aromatization, hydrofining and hydrocracking, as well as cyclization, hydrogenation, dehydrogenation and hydroforming.

What is claimed is:

1. A catalyst for the conversion and treatment of hydrocarbons consisting of from about 0.1 to 2.0% by weight of platinum, supported on a zinc-alumina spinel base.

2. A catalyst according to claim 1 in which the zinc-alumina base is prepared and subsequently treated with a platinum compound in aqueous solution, dried, and reduced with hydrogen to give a finished catalyst.

3. A catalyst according to claim 1 in which the alumina is derived from sodium aluminate.

4. A catalyst according to claim 1 in which the alumina is derived from an aluminum alcoholate in anhydrous solution.

5. A catalyst according to claim 4 in which the zinc is derived from a zinc acetate solution.

6. The non-regenerative process of converting a heavy naphtha feed stock to a product of at least 90 clear Research octane number by the A. S. T. M. method of test which comprises vaporizing said heavy naphtha, and passing its vapors at a temperature of from about 750 to 1050° F. in the presence of a hydrogen-containing diluent gas supplied at the rate of from about 1,000 to 12,000 cu. ft./barrel of liquid feed and at a reaction pressure in the range of about 500 to 1,000 p. s. i. g. in contact with a catalyst consisting essentially of about 0.1 to 2.0% by weight of platinum uniformly dispersed upon a zinc-alumina spinel base consisting of from about 30 to 50 weight percent of ZnO with from about 70 to 50 weight percent of $Al_2O_3$ prepared from the mixed hydrous oxides of zinc and alumina.

References Cited in the file of this patent
UNITED STATES PATENTS

| | | |
|---|---|---|
| 2,337,421 | Spence et al. | Dec. 21, 1943 |
| 2,398,820 | Dalton et al. | Apr. 23, 1946 |
| 2,447,017 | Kearby | Aug. 17, 1948 |
| 2,456,633 | Haensel | Dec. 21, 1948 |
| 2,548,860 | Bond | Apr. 17, 1951 |
| 2,602,772 | Haensel | July 8, 1952 |
| 2,611,736 | Haensel | Sept. 23, 1952 |
| 2,662,861 | Riblett et al. | Dec. 15, 1953 |